United States Patent [19]

Mott et al.

[11] Patent Number: 4,736,967
[45] Date of Patent: Apr. 12, 1988

[54] TUBULAR PIN CONFIGURATION TO PREVENT GALLING WHILE ENSURING SEALING

[75] Inventors: Keith C. Mott; Patrick E. McDonald, both of Houston; Gary E. Kirsch, Tomball; H. Paul Barringer, Humble, all of Tex.

[73] Assignee: The Hydril Company, Houston, Tex.

[21] Appl. No.: 937,690

[22] Filed: Dec. 4, 1986

[51] Int. Cl.$^4$ .............................................. F16L 15/00
[52] U.S. Cl. ...................... 285/94; 285/328; 285/333; 285/334.4
[58] Field of Search ............ 285/333, 334, 334.4, 285/328, 94, 355, 390

[56] References Cited

U.S. PATENT DOCUMENTS

| | | | |
|---|---|---|---|
| 2,893,759 | 7/1959 | Blose | 285/334 |
| 2,992,019 | 7/1961 | MacArthur | 285/334 X |
| 3,224,799 | 12/1965 | Blose et al. | |
| 3,353,850 | 11/1967 | Butz et al. | 285/334.4 X |
| 4,623,173 | 11/1986 | Handa et al. | 285/334 X |

FOREIGN PATENT DOCUMENTS 2116276 9/1983 United Kingdom ............. 285/334.4

OTHER PUBLICATIONS

Machine Data Handbook, 3d Edition, vol. 2, Machinability Data Center, 1980, pp. 18-3 through 18-19.
API Bulletin on Thread Compounds for Casing, Tubing and Line Pipe, American Petroleum Institute, API Bul. 5A2, 5th Ed., 4/1972.

Primary Examiner—Dave W. Arola
Attorney, Agent, or Firm—Vaden, Eickenroht, Thompson & Boulware

[57] ABSTRACT

A tubular connection includes a shallowly tapered conical sealing surface. The areas on the pin member where make up and sealing respectively occur in the various embodiments comprise multiple angles and surface texturing for the purpose of lubricant retention, facilitate burnishing and reduce the propensity for galling in multiple make up and break out situations. The pin taper in each case is slightly less than the box taper. The area on the pin member is textured ahead of the very smooth seal area to retain some thread compound even after repeated makeups of the connection. The area ahead of the sealing area where stabbing contact is made is textured in the 125-250 $R_a$ range while the smooth seal area is textured about 63 $R_a$ to provide a gas tight seal under high pressure and severe conditions of combined loads and thermal shock. Hence, the invention allows the use of a smoother seal surface for high temperature gas tight integrity than would otherwise be achieved after the connection is subjected to repeated make ups and break outs.

9 Claims, 3 Drawing Sheets

TUBULAR PIN CONFIGURATION TO PREVENT GALLING WHILE ENSURING SEALING

BACKGROUND OF INVENTION

1. Field of Invention

This invention pertains to tubular connections and particularly to high quality or premium connections that are subject to high temperatures or temperature cycling and that must retain their pressure sealing integrity even after a plurality of connection makeups.

2. Description of the Prior Art

Tubular products, such as tubings and casings, employed in deep hole applications in the oil and gas industry, are subjected to extremely harsh environmental conditions. The connections or joints employed in a tubular string must be suitable to withstand the conditions to which such tubular products are subjected. Among these severe conditions are the extremely high temperatures and pressures that exist and the fact that the connections often have to be repeatedly made up (assembled) and broken out (disassembled).

A connection of the type described in the prior art typically includes one or more thread sets. If more than one set is included there is included a step therebetween. The connection also includes one or more metal-to-metal conical sealing surfaces between the box member of the connection and the pin member of the connection that are subject to large relative motion while in contact during the time that the connection is being made up and broken out. That is particularly true for the sealing surfaces that have a shallow taper or a low angle profile. In such case, the contact duration is long and the bearing stresses are high. Both of these factors tend to subject the surfaces to galling.

Typically, the conical sealing surfaces just described are provided on either side of the thread set or sets and, for a stepped thread configuration, in the area between the thread sets. Sealing does not necessarily occur at all of these locations, but does occur at at least one of them. The surfaces where a seal is effected have to be generally smooth, normally less than 63 $R_a$ (when burnished) in circular texture or finish, since a rougher texture than this will tend to leak gases under the very high pressures that exist. To further prevent leakage and to lubricate the connection, a suitable thread compound composed of lubricants and solid particles to act as dams to "plug" leakage paths in such a connection is generally employed in accordance with API standards as set forth in API BUL 5A2 published by the American Petroleum Institute, especially with metal-to-metal seals that are not required to be highly reliable with only a metal-to-metal sealing action.

Although such smooth sealing surfaces treated with thread compound are suitable for making a single connection, when the connection is broken out and made up again, the sealing surfaces tend to become more slick as the surfaces polish (in a sense, burnish) and the thread compound is baked and squeezed out and scraped off. This action exposes the surfaces to galling. Once a sealing surface is galled, then it is subject to leakage under pressure.

It has been discovered that galling can effectively be reduced or eliminated by texturing one or more of the mating surfaces or areas where sealing occurs with minute scallops that ensure the retention of thread compound even after a threaded connection is made up and broken out many times. Other surface treatment such as with phosphate coatings are also employed to reduce galling tendencies of connections and frequently multiple anti-galling devices are used simultaneously.

The texturing that has been done in the prior art for the purpose of reducing the occurrence of galling is shown, for example, in area 12 of the structure shown and described in U.S. Pat. No. 3,224,799, Blose, et al., issued Dec. 21, 1965. In the Blose, et al. structure, the taper of the conical sealing surface of the pin member is assumed to be the same as the mating conical sealing surface of the box member. The texturing of the surfaces are helical in nature and at a very short pitch compared with the thread pitch. The helical texturing is sometimes referred to as "phonograph finish" texturing or merely phonograph texturing. In cross-section, such a surface will appear as minute scallops. Thus, during each make up of the connection, the so-called threads of the scalloped surfaces are in fact cross-threaded and form a series of minute pockets that trap thread compound. This trapped compound prevents galling each time the connection is broken out and made up again.

Although the "phonographic finish" is successful in reducing galling of conical seals, it has been demonstrated that the undammed valleys between the peaks are sources of leakage paths for high pressure gases, particularly when the connections are subject to thermal cycling. Thus, "phonographic finish" metal-to-metal seals when used with API thread compounds do not display the high reliability of pressure integrity demonstrated by higher grade conical seals with smoother surface finishes. However, the helical texturing of the phonographic finish does entrap lubricants which prevents or reduces the galling of metal-to-metal conical seals as they slide against each other during make up or break out.

Conical seals are preloaded in the radial direction as the pin is threaded axially into the box during makeup. The preload on the conical surfaces provides the barrier to leakage of fluids or gases across the seal. As the conical surfaces are threaded together, deflection of the sections occurs which causes the high preloads to be distributed at various locations of the conical seal and contributes to more severe galling conditions to occur on the pin surfaces. When the pin and box conical seals are fabricated with the same conical angle and assembled, the deflection of the less rigid pin causes the point of rubbing contact to move axially along the conical seal so that no point on the seal is subjected to galling loads for a long helical arc of contact as shown by the illustrations of FIGS. 2 and 3. In FIG. 2, the pin member and the box member are shown just prior to contact. Points A and B on the pin member are at the extreme ends of the area of contact, point B is at the nose end of the area and point A is at the opposite end. Points A' and B' are on the box member surface and are the points that come into initial contact respectively with points A and B. As the connection is tightened, as shown in FIG. 3, the pin member conical surface is deflected (the amount of deflection being greatly exaggerated for illustration purposes) so that a zone AC is in rubbing contact with the box member, point C being intermediate AB. Point B is not in contact with the box member. Thus, the contact area is reduced and all radial preloads cause the bearing stresses to rise, which results in a burnishing action to make rough surfaces smooth, and thus they effectively and reliably seal high pressure gases.

When the pin and box are fabricated with dissimilar conical angles and assembled, the leading edge of the seal is in contact for a longer helical distance during make up and is subjected to more severe galling conditions as shown by the illustration of FIGS. 4, 5 and 6. In FIG. 4, the pin member and the box member are shown just prior to contact. Again, point B on the pin member is at the nose end of the conical area and point A is at the extreme opposite end. Points A' and B' are the initial contact points on the box member corresponding respectively to points A and B. Because of the dissimilar angles of the pin and box members, during assembly as shown in FIG. 5, point B continues to rub as the pin deflects so that at an intermediate position in the assembly process, zone BC of the pin surface is in contact, point C being intermediate AB. Point C' is the point on the box member corresponding with point C. At final assembly, shown in FIG. 6, point A has made contact and rubbed a short distance as the final seal surfaces become substantially parallel. The entire zone AB of the pin member is in contact with the box member. The resulting metal-to-metal seal contact of originally dissimilar angles is a longer zone of contact than for the connection shown in FIGS. 2 and 3, which, even if minor discontinuities in the surface occur and offer a texturous labyrinth to gases attempting to leak across the seal, the contact zone is nevertheless leak tight for practical purposes.

Therefore, it is a feature of the present invention to provide an improved thread connection that effectively seals under such high temperature or temperature cycling conditions and in the presence of such high pressures and does not gall when subject to multiple make ups and break outs.

It is another feature of the present invention to provide an improved thread connection that has the seal area of the pin at a slightly less taper than the seal area of the box and that includes phonograph finish texturing ahead of the smoother point of seal makeup contact on the pin member of the connection so as to provide retention of thread compound in the scallops of the texture and so as to permit metal-to-metal sealing behind the textured surface.

It is still another feature of the present invention to provide in one embodiment of an improved thread connection, a slightly convex surface, which is also textured, just ahead of the point of seal makeup contact on the pin member of the connection so as to provide enhanced lubrication during stabbing and make up.

It is yet another feature of the present invention to provide another embodiment of an improved thread connection that has landing contact areas of pin and box at the same taper in front of the seal area on the pin, the seal area on the pin being at a lesser angle than the box seal area, the landing area on the pin being suitably textured for a short distance for thread compound retention and immediately followed by a smoother surface conical seal of higher grade pressure integrity for improved sealing reliability.

SUMMARY OF THE INVENTION

A tubular connection in accordance with the present invention generally comprises a pin member and a box member having at least one conical sealing surface therebetween. Preferably, but not necessarily, this sealing surface is forward of the thread set or sets on the pin member and is at a low taper angle. Prior to the make up, the longitudinal profile taper of the sealing surface of the pin member is less steep than the corresponding sealing surface of the box member. Hence, the initial contact point of the sealing surfaces when the connection is made up to handtight condition is forward on the pin member from the eventual area of sealing when the connection is completely power torqued. The conical sealing area on the pin member is textured behind the initial contact point in such a manner to retain thread compound therein even after repeated make up and break out operations of the connection. The final sealing area located behind this textured area is not textured, thereby preventing pressure leakage from occurring. One embodiment includes a textured convexly curved area on either side of the place where stabbing occurs on the pin member sealing area. The eventual sealing area when the connection is fully torqued is located on the upstream side or the side away from the end of the pin member from this textured area. Another embodiment includes a landing area on the pin that is substantially equal in taper to the box taper, this landing area being where the stabbing occurs, this area also being textured. Another, and probably the preferred embodiment, includes the textured surface and the smooth seal on the same conical surface of the pin member such surface being at a smaller conical angle than the corresponding surface of the box member. The eventual sealing area when the connection is fully torqued is in an area on the pin member that is less steep than the taper on the box member, the sealing area being located on the upstream side or the side away from the end of the pin member from the textured landing area.

BRIEF DESCRIPTION OF THE DRAWINGS

So that the manner in which the above-recited features, advantages and objects of the invention, as well as others which will become apparent, are attained and can be understood in detail, more particular description of the invention briefly summarized above may be had by reference to the embodiments thereof which are illustrated in the appended drawings, which drawings form a part of this specification. It is to be noted, however, that the appended drawings illustrate only preferred embodiments of the invention and are therefore not to be considered limited of its scope as the invention may admit to other equally effective embodiments.

In the Drawings

DESCRIPTION OF THE PREFERRED EMBODIMENTS

Figure 1:
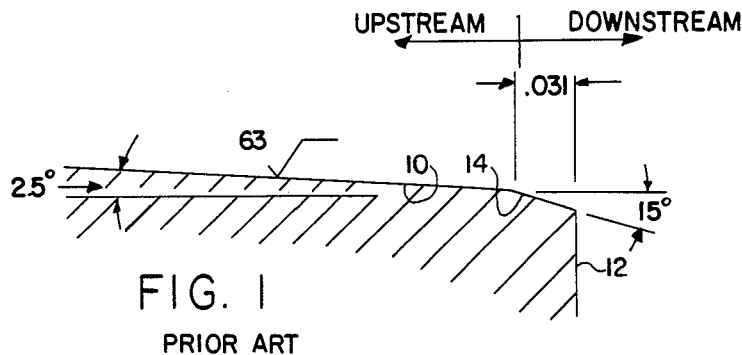
FIG. 1 is a longitudinal profile of a part of a conical sealing area of a tubular pin member in accordance with the prior art.
Figure 2:
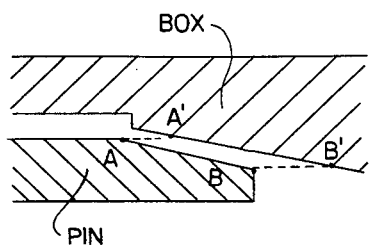
FIG. 2 is a longitudinal profile of a tubular pin member and connecting box member just prior to initial contact wherein the conical areas where sealing occurs are respectively at the same angle.
Figure 3:
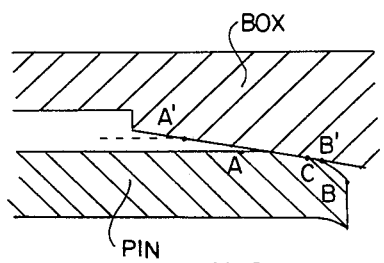
FIG. 3 is a longitudinal profile of the connection shown in FIG. 2 after make up.
Figure 4:
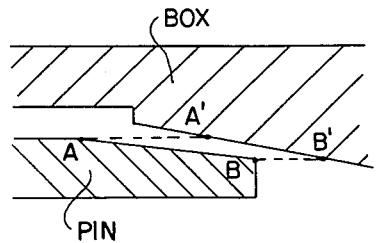
FIG. 4 is a longitudinal profiles of a tubular pin member and connecting box member just prior to initial contact when the conical area where sealing occurs on the pin member is not as steep as the corresponding area on the box member.
Figure 5:
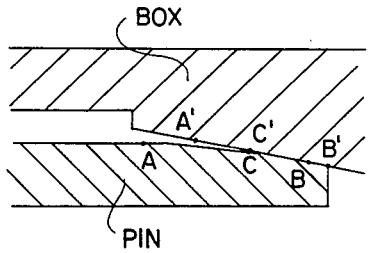
FIG. 5 is a longitudinal profile of the connection shown in FIG. 4 at an intermediate position during make up.
Figure 6:
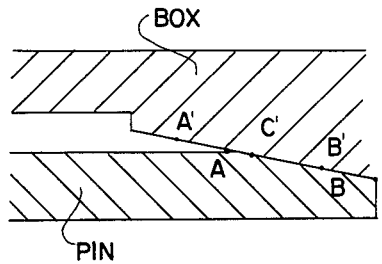
FIG. 6 is a longitudinal profile of the connection shown in FIGS. 4-5 after make up.

Now referring to the drawings and first to FIG. 1, a partial longitudinal profile of the sealing area of a tubular pin member in accordance with the prior art is illustrated. The profile shows a sealing area 10 that is generally forward on the pin member of the thread set or sets (not shown) and which is upstream from the end or nose 12 of the member. The upstream and downstream directions are marked on the figure, which directions apply throughout to the other figures, as well. Although discussed in connection with a seal in this location, the location can be at another one of the places where seals are designed to occur, as noted above. Sealing area 10 is tapered at a relatively low angle to the longitudinal axis of the connection. In the illustration, this is shown to be 2.5°, although this angle can vary up to 14° or even more and be within the scope of this invention. The sealing surface is sufficiently smooth so that it will effectively seal against the corresponding sealing surface of the box member without leaking under high pressure gases. A helical or phonograph finish texture of 63 $R_a$ is typical in practice for this purpose when appropriate contact bearing stresses are employed to prevent leakage and to burnish the 63 $R_a$ finish to form a leak tight gas seal.

The profile of the pin member shows that the nose is chamfered at a 15° angle just behind end 12 and in front of area 10. The longitudinal dimension of this chamfer 14 is typically approximately 0.031 inches long, although this length and the angle of 15° are not critical dimensions with respect to this invention.

Studies have shown that there is a reasonable probability that galling will occur in the FIG. 1 prior art connection somewhere between the first and sixth time the connection is made up when surface 10 is very smooth and does not incorporate a "phonographic finish". It is believed that this is a result of causing the area to become burnished, which effectively removes or eliminates the protective thread compound from the connection. Once galling has occurred, the connection is unacceptable in performance as a high quality or premium connection under high pressure conditions.

It has been further discovered that when surface 10 is helically or phonographically textured to 125-to-250 $R_a$ the probability that no galling will occur in normal usage even after the connection is repeatedly made up and broken out is extremely high. This is because the textured area will resist becoming burnished to a degree that removes the thread compound. Hence, the connection will stay adequately lubricated to resist galling. However, such a connection will not reliably seal under high gas pressure and thermal shock because of the roughness of the sealing area (although such a connection can be made to reliably seal liquids under thermal shock conditions because of their far greater viscosity).

Figure 7:
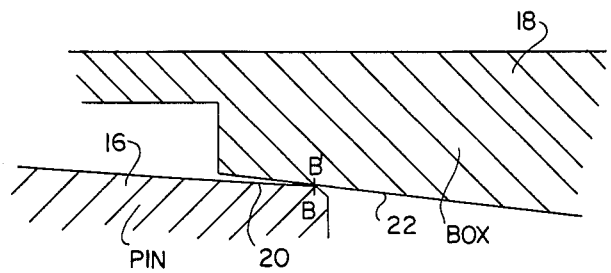
FIG. 7 is a longitudinal profile of a part of a tubular pin member and connecting box member at the point of initial contact during makeup in accordance with the present invention.
Figure 8:
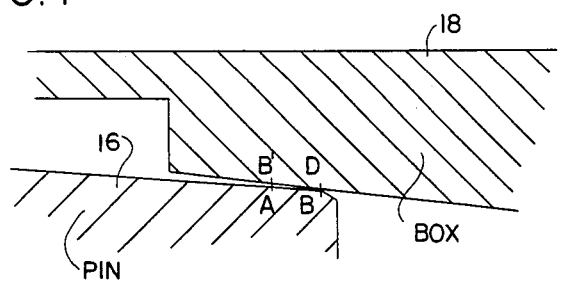
FIG. 8 is a longitudinal profile of the connection shown in FIG. 2 after being torqued to provide sealing.

Now referring to FIGS. 7 and 8, a description of sealing action common to all of the embodiments described herein is illustrated. The taper surface of the pin just behind the end chamfer is about 2.5° and the taper surface of the box is about 3°. These are typical tapers, but the angles can be different, including up to about 14° and possibly even greater. It is important that the box angle is slightly greater than the pin angle as determined by the respective goemetrics of the pin member and the box member. FIG. 7 illustrates pin member 16 coming into initial contact with box member 18 during makeup. Although such box and pin members are on connecting tubular sections or joints, such a connection also occurs when connecting adjacent tubular sections using a coupling. Hence, the connection can be employed on coupled connections as well as integral connections. Therefore, reference herein is made generically to "pin member" and "box member". As noted, the taper of the sealing area 20 of the pin member is slightly less steep than the taper of sealing area 22 of the corresponding box member, this relationship being exaggerated in FIGS. 7 and 8 for illustration purposes. The point of contact for the pin member is at point "B'", a point just behind the chamfer on the end of pin member 16. The point of contact for the box member is at point "B'".

As the connection is made up, the pin member is advanced so that point "B" is deeper within box member 18 than point "B'". In FIG. 8, the pin member has been advanced sufficiently far that point "B" is opposite a point "D" on the box member and point "A" on the pin member, which is further away from the end of the pin member than point "B", is opposite point "B'". It has been discovered that if the area or band between "B" and "A" is textured to 125-250 $R_a$, then the connection has a high probability of not galling. Statistical analysis indicates a minimum of 18 make ups and break outs will occur without galling. Actual test data show that 44-51 successful make ups and break outs have been made without galling. It should be further noted that the seal area is behind the place where point "A" makes contact with point "B'" as the connection is power torqued beyond the position shown in FIG. 8, which seal area is on the side of the textured area of the pin member away from the end of the pin member.

Figure 10:
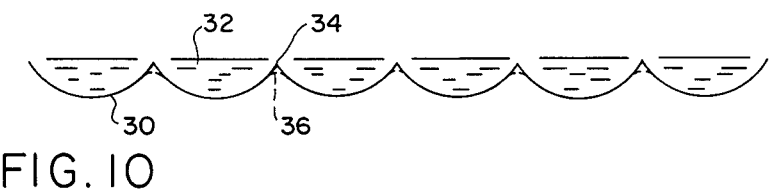
FIG. 10 is an enlarged partial view of the textured area ahead of the sealing surface prior to initial makeup in accordance with the present invention.

The action that occurs in making up or breaking out the connection vis-a-vis the textured area can be explained by reference to FIGS. 10 and 11. FIG. 10 shows an enlargement of a cross-section of the textured area, which can best be described as including a plurality of scallops 30. Located or entrapped in each of the scallops is appropriate thread compound 32. It should be noted that the metal between the scallops comes to a high point 34. The thread compound is initially at a level equal to the height of point 34.

Figure 11:
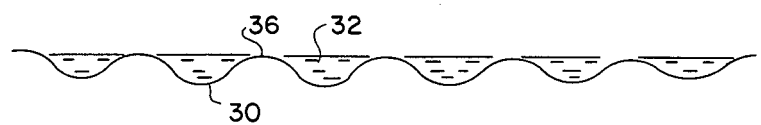
FIG. 11 is an enlarged partial view of the textured area shown in FIG. 5 after at least one connection makeup.

When the connection is made up, the high points are knocked or rounded off, such as shown in FIG. 11. This is the so-called "burnishing" action that occurs. The thread compound, of course, also is lowered in level from its condition in FIG. 10; however, some of thread compound 32 remains in place to provide scraping lubrication ahead of the seal area. The remaining presence of some lubrication reduces the probability of galling.

Figure 9:
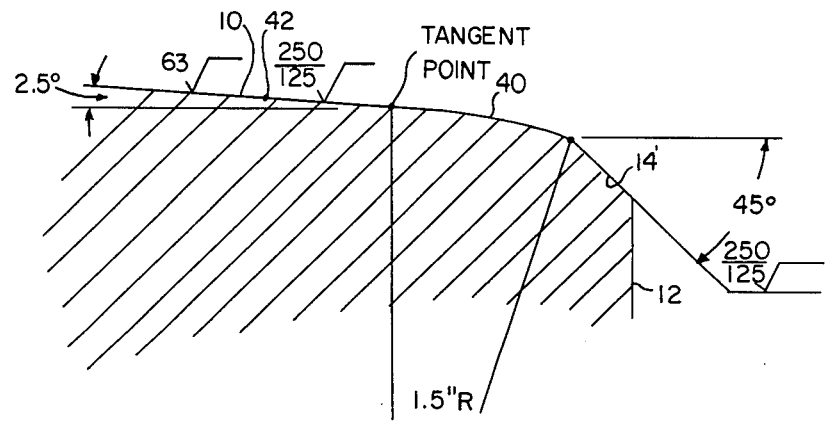
FIG. 9 is a longitudinal profile of a part of a conical sealing area of one embodiment of a tubular pin member in accordance with the present invention.

FIGS. 7 and 8 illustrate a first embodiment of the invention wherein taper 20 has a straight and continuous profile. Now referring to FIG. 9, a second embodiment of a pin member in accordance with the present invention is illustrated. The pin member includes a tapered conical surface 10 having a straight line profile and an end 12, similar to the pin member shown in FIG. 1. However, chamfer 14' behind end 12 is at a steeper angle, in this case an arbitrary angle of 45°. The profile of area 40 between chamfer 14' and straight surface 10 is slightly convexly curved. This can be provided by turning the pin member at this location on a big radius, such as at 1.5 inches. This curve, however, can be provided in other ways and does not have to be with respect to the radius of a circle. A tangent point exists between area 40 and straight area 10. The stabbing point on the pin surface when the connection is first made up is somewhere on area 40 and in front of the tangent point. This is the point that comes into contact with the box member when the pin member is stabbed into starting position for makeup. It should be noted that the tangent point is some distance from the chamfer edge, in the example illustrated, about twice more the distance of the chamfer edge. When the connection is torqued to complete the makeup, the sealing location is at point 42, a distance upstream from the tangent point of about two-thirds the distance from the chamfer edge to the tangent point.

As illustrated the entire area forward of point 42 through chamfer 14' is preferably textured to 125-250 $R_a$. Now, when the pin member is stabbed into the box member, the actual point of contact will probably be at a distance somewhat in front of the tangent point. Actually, some rocking will occur until the connection is optimumly aligned for subsequent make up. This means that lubrication will be provided to the connection from wherever the starting point of contact until the smooth seal location is reached at location 42. The starting point may even be down on the chamfer surface, which is steeper than the chamfer in FIG. 1 and has some beneficial advantage thereover. The probability of galling occurring in the connection described for the FIG. 9 structure is quite remote. Galling will not occur until after the connection has been made up at least 18 times. Sealing, it should be noted, is always on a non-leakage or smooth surface, not on a highly textured surface.

Figure 12:
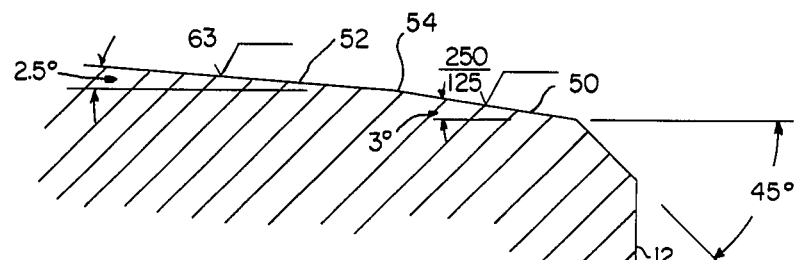
FIG. 12 is a longitudinal profile of a part of a conical sealing area of a preferred embodiment of a tubular pin member in accordance with the present invention.

Now referring to FIG. 12, another embodiment of the invention is illustrated. As will be seen, the chamfer behind front end 12 is at the selected 45° angle shown for the other embodiments. Behind the chamfer is area 50, which is a straight profile area at the same approximate angle as the taper of the box member with which the pin member mates in the connection. This illustrated taper is 3°. A typical length of area 50 is about the same distance to the tangent print in the FIG. 9 embodiment. Upstream from area 50 is another straight profile area 52, which is the sealing area. The taper of the area 52 is less than the taper of area 50. In the illustration, this is shown as 2.5°. Junction point 54 joins area 50 to area 52.

Area 50 is textured in the manner previously described at 125-250 $R_a$ and area 52 is textured at 63 $R_a$. In making the connection, area 50 lands on a mating surface of the box member. Unlike the previously described embodiments, landed area 50 makes surface contact rather than point or line contact. As the connection is made up, the final sealing point is upstream of junction point 54, on surface 52, as with the other embodiments. Surface 50, being in surface contact during the initial makeup operation, provides even more lubrication and results in less burnishing than the other embodiments, even after repeated make up and break out operations. It is anticipated that the probability of galling occurring before twenty completed operations is extremely remote. FIG. 12 illustrates the details of FIG. 9 for a radius that increases up to an infinite value.

Figure 13:
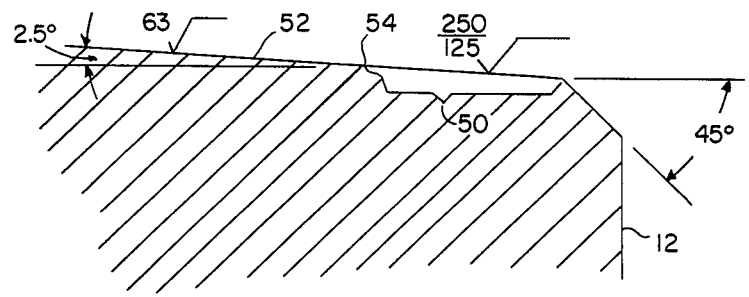
FIG. 13 is a longitudinal profile of a part of a conical sealing area of the pin of a preferred embodiment in accordance with the present invention.

Now referring to FIG. 13, a possibly preferred embodiment of the invention is illustrated. In this embodiment, the taper angle or the front part of the pin area where the texturing is at 125-250 $R_a$, and the remaining portion where the finish is textured at 63 $R_a$, is the same. Both surfaces have a straight line profile. In essence, the FIG. 12 and FIG. 13 embodiments are the same with there being no change of angle at point 54.

While particular embodiments of the invention have been shown and described, it will be understood that the invention is not limited thereto, since modifications may be made and will become apparent to those skilled in the art. For example, the taper angles, chamfer angles, distances and the like could be modified without deviating from the spirit of the invention.

What is claimed is:

1. A tubular connection including a threaded box connecting member in threaded engagement with a mating threaded pin connecting member, comprising
said box connecting member having a metallic sealing surface at a low angle with respect to the axis of the connection,
said pin connecting member having a distal end and a conical area including a contact location upstream from said distal end where the conical area of the pin member initially contacts said metallic sealing surface of said box connecting member, a textured surface upstream from said contact location, and a smooth metallic sealing surface upstream from said textured surface, said pin connecting member metallic sealing surface mating with said metallic sealing surface of said box connecting having an angle with respect to the axis of the connection that is less steep than the angle of said metallic sealing surface of said box connecting member, tight makeup of said connection effecting a metal-to-metal seal of said metallic sealing surface of said box connecting member and said metallic sealing surface of said pin connecting member on said smooth surface upstream from said textured surface on said pin connecting member.

2. A tubular connection in accordance with claim 1, wherein said metallic sealing surface on said pin connecting member has a straight line surface profile on the upstream side of said initial contact location.

3. A tubular connection in accordance with claim 1, wherein said smooth surface has a texture of no greater than about 63 $R_a$ and said textured surface has a texture in the range of between about 125 $R_a$ and 250 $R_a$.

4. A tubular connection in accordance with claim 1, wherein said textured surface on said pin connecting member has a straight line surface profile substantially equal in taper with the taper of said metallic sealing surface of said box connecting member.

5. A tubular connection in accordance with claim 1, and including a chamfered end adjacent said distal end of said pin connecting member.

6. A tubular connection in accordance with claim 1, wherein said textured surface includes a plurality of scallops and including thread compound within the scallops of said textured surface.

7. A tubular connection in accordance with claim 1, wherein said initial contact location is continuously textured with said textured surface and at the same straight line surface profile therewith and at a substantially equal taper with the taper of said metallic sealing surface of said pin connecting member.

8. A tubular connection in accordance with claim 1, wherein said contact location is a textured surface that is slightly convexly curved in profile.

9. A tubular connection in accordance with claim 1, wherein said textured surface is helically phonograph finished.

* * * * *